United States Patent [19]
Barber et al.

[11] Patent Number: 6,128,668
[45] Date of Patent: Oct. 3, 2000

[54] SELECTIVE TRANSFORMATION OF MULTIMEDIA OBJECTS

[75] Inventors: Ronald Jason Barber; Robert Carl Barrett, both of San Jose, Calif.

[73] Assignee: International Business Machines Corporation, Armonk, N.Y.

[21] Appl. No.: 08/966,476

[22] Filed: Nov. 7, 1997

[51] Int. Cl.[7] .............................................. G06F 15/177
[52] U.S. Cl. ......................... 709/246; 709/228; 709/232
[58] Field of Search ................................... 709/227, 228, 709/232, 233, 234, 223, 224, 246, 247

[56] References Cited

U.S. PATENT DOCUMENTS

| | | | |
|---|---|---|---|
| 5,164,938 | 11/1992 | Jurkevich et al. | 370/60 |
| 5,392,072 | 2/1995 | Rodriguez et al. | 348/405 |
| 5,469,212 | 11/1995 | Lee | 348/392 |
| 5,485,211 | 1/1996 | Kuzma | 348/409 |
| 5,488,411 | 1/1996 | Lewis | 348/8 |
| 5,515,511 | 5/1996 | Nguyen et al. | 395/200.2 |
| 5,533,051 | 7/1996 | James | 375/240 |
| 5,535,137 | 7/1996 | Rossmere et al. | 364/514 A |
| 5,541,640 | 7/1996 | Larson | 348/19 |
| 5,557,320 | 9/1996 | Krebs | 348/12 |
| 5,563,649 | 10/1996 | Gould et al. | 348/17 |
| 5,564,001 | 10/1996 | Lewis | 345/302 |
| 5,634,006 | 5/1997 | Baugher et al. | 709/224 |
| 5,708,778 | 1/1998 | Monot | 709/220 |
| 5,727,129 | 3/1998 | Barrett et al. | 706/10 |
| 5,727,159 | 3/1998 | Kikinis | 709/246 |
| 5,918,013 | 6/1999 | Mighdoll et al. | 709/217 |
| 5,999,979 | 12/1999 | Vellanki et al. | 709/232 |
| 6,061,722 | 5/2000 | Lipa et al. | 709/224 |

FOREIGN PATENT DOCUMENTS

WO 9608095   3/1996   WIPO .......................... H04L 12/28

OTHER PUBLICATIONS

"Determination of Bandwidth and Latency in a Multimedia Communication Environment", *IBM—Technical Disclosure Bulletin*, 37:02A, Feb. 1994.

"Stream Embedded Compressor/Decompressor", *IBM—Technical Disclosure Bulletin*, 38:09, Sep. 1995.

"Compressed/Encrypted Multimedia Objects Realtime Search and Retrieval", *IBM—Technical Disclosure Bulleti*, 37:03, Mar. 1994.

B. Zenel et al., "Intelligent Communication Filtering for Limited Bandwidth Enviroments", Computer Science Dept., Columbia University, 8 pgs., ARPA order No. B094, ONR contract N00014–94–1–0719 and NSF Eng. Res. Ctenter grant No. ECD–88–11111, date unknown.

*Primary Examiner*—Dung C. Dinh
*Attorney, Agent, or Firm*—Gray Cary Ware Freidenrich

[57] ABSTRACT

Dynamically transforming transfer parameters for a media object to allow efficient transmission of the object from a first system to a second system. The transformer may receive transfer feedback and is configured such that it dynamically modifies system constraints or object formatting to overcome system limitations which may slow the transfer. The invention may be integrated into an internet service provider's (ISP) system structure and used to dynamically determine the transfer parameters between the ISP and the end-user. After the ISP accesses a requested internet site and its web site server, a media object from the web site is transferred to the ISP. The ISP transfers the information to the end-user and, during the transfer, receives system feedback regarding bandwidth availability, performance, information latency, and other items of interest. Using this feedback, transfer parameters are automatically selected to increase efficiency of system resources for subsequent media transfers. Transfer parameters may alternatively be anchored by the ISP or the end-user to prevent dynamic modification.

32 Claims, 4 Drawing Sheets

SELECTIVE TRANSFORMATION OF MULTIMEDIA OBJECTS

BACKGROUND OF THE INVENTION

1. Field of the Invention

The present invention relates to using a transformer to speed-up multimedia communications between a first system and a second system. More particularly, the invention concerns dynamically monitoring a transfer of multimedia information and modifying subsequent media transfers or system transfer parameters to overcome system and bandwidth constraints affecting the speed of a transfer.

2. Description of the Related Art

Multimedia information—information that may take on numerous forms which can be enhanced or diminished depending upon the importance of the particular information being conveyed—can be transmitted in a variety of applications over a network. For example, in a video environment there may be foreground and background information provided to a screen. The screen will typically be a video screen, such as a television set, or a computer monitor. The most common example of this type of system is an interactive video system such as seen on cable television networks (i.e., QVC or Home Shopping Network). These types of systems allow for a viewer to look at the screen and pick the type of product that he or she may want based on reviewing the information on the screen and then calling a particular telephone number to purchase the product.

Multimedia information may also include audio information in which, for example, the news or weather is transmitted using background sounds such as white noise, background music or other information. Multimedia information can also be a combination of graphics, video and music in an entertainment form, or as mentioned above, in an interactive system. Interactive systems are presently available that allow an individual access to video, audio and graphic information on a network.

However, presently known systems have the problem of requiring a large amount of bandwidth to allow for the high quality speedy transmission of the multimedia information. For example, in the case of video information, as much as 30 MB/sec bandwidth is required to send a quality video signal along a transmission path, and audio transmissions may require as much as 10 MB/sec bandwidth to allow high quality audio signals to be reproduced accurately. In many cases, usually involving non-commercial computers and systems, it is impossible to attain these transmission requirements to assure speedy transfers of high quality multimedia information.

Bandwidth—a measure of the information carrying capacity of a transmission channel—is limited by the type of media used to make the transmission. What is meant by limited bandwidth can be viewed in two different ways. First, limited bandwidth can be the total available bandwidth at any "instance in time." Another way of measuring limited bandwidth is by determining the bandwidth available over a "specific time period." For example, the overall available bandwidth, such as in telephone networks where the bandwidth is approximately 10 Kilohertz, is measured at any instance during a telephone call. However, the available bandwidth over a specified period of time could be very high because a particular telephone set is not utilized constantly, that is, telephone calls generally only happen occasionally during the day.

However, in looking at a bandwidth network such as cable television, although the size of the bandwidth is significant, most of the available bandwidth is utilized for providing a continuous network signal. In this example, the available bandwidth over a specified period of time might be much less than the above-mentioned telephone system because the broadcast continues during most of the day. But the bandwidth used at any instance in time might be quite lower, such as during the broadcast of a test pattern.

Telephone networks have traditionally been used to transmit data or voice information. There are also telephone sets that can also transmit video information over telephone lines. For example, American Telephone and Telegraph (AT&T) has introduced a video phone which can transmit video images across a telephone network. As technology advances, it is apparent that telephone networks, cable networks, and wireless links will be increasingly used for transferring multimedia information.

Because of the low cost of implementation, a typical telephone network with a limited bandwidth for transmitting multimedia information is currently in wide use. However, particularly when attempting to transmit video information—requiring a significant bandwidth—telephone lines are inadequate for providing quick transmission of a high quality multimedia image.

At the same time, the world wide web (WWW) has exploded with the WWW pages designed with high-bandwidth users in mind, yet a large percentage of web clients use low-speed modems such as a 14.4 or 28.8 modem. To speed up transmissions, users are increasingly considering wireless services to increase multimedia transfer rates due to larger bandwidths. This demand for wider bandwidth connections is due to the lack of available bandwidth from WWW servers to web clients using conventional telephone lines. Alternatively, WWW users that wish to reduce bandwidth requirements are connecting to the WWW with graphics turned off, that is, where the graphics used on a web page are not transmitted or "downloaded". This graphics-less connection eliminates annoying delay or latency problems associated with downloading heavy graphic content web pages. However, because of the heavy commercial advertisement use of the web locations, corporations who are paying for the visibility of their corporate logo or the logo associated with their products are concerned that their "logos" are being edited from the download materials. Also, many pages are less useful, or unusable, with graphics turned off. The solution to "selective" editing is to either increase bandwidths, decrease the amount of information transferred, or change the way the multimedia information is transferred.

Methods for reducing the bandwidth required for downloading the multimedia information have been developed but, as a whole, are inadequate. For example, substituting a text string for the graphic has been attempted. However, most advertisers find that text is no substitute for the visibility obtained by a logo. Minimizing the size of the image downloaded without sacrificing image quality has been suggested, but these techniques typically provide at most a factor of 1.5 to 2 in compression, and offer little savings in the bandwidth used during transmission. Tile advantages gained by this method are negligible when considering the limitations of the internet connections versus consumer modems.

Another method to deal with the low bandwidth of telephone communication lines is for a WWW page to offer multiple versions of the pages that can be downloaded. For example, the page may offer a download where there are no graphics, minimal graphics or full graphics Most web sites, however, do not have the human resources nor disk space to provide multiple page versions. Unfortunately, there currently is no way to optimize a single page for delivery to both high-bandwidth and low-bandwidth clients. Also, this methods does not eliminate the selective editing concerns discussed above.

Lastly, caching and pre-fetching multimedia information has been used to reduce initial server-client latency and server-cache bandwidth requirements. However, this technique does not reduce cache-client bandwidth requirements. As is apparent, each of the methods discussed above are ineffective in reducing the bandwidth required to make a transfer and are merely attempts to reduce the amount of multimedia information being transferred.

SUMMARY OF THE INVENTION

Broadly, the present invention concerns dynamically using a transformer to efficiently transfer media objects from a first system to a second system, such as an internet site's server to an end-user's system. The transformer receives transfer feedback and is configured such that it may dynamically modify system constraints or object formatting to overcome system limitations which may slow the speed of a transfer.

In one embodiment, the invention may be implemented to provide a method by which an internet service provider's (ISP) system integrates the transformer into its structure and dynamically determines the transfer parameters between the ISP and the end-user. Although the following summary discusses a transfer with respect to an ISP to end-user link, the example is not intended to limit the implementation of the invention. The method begins when an end-user requests a media object be transferred from a web site to his computer. The request passes from the end-user computer to the ISP which may include the transformer. The ISP accesses the internet and a web site server based upon the end-user request. An object transfer from the web site to the ISP begins The ISP transfers the media objects to the end-user and, during the transfer, receives system feedback regarding various parameters such as. for example, bandwidth availability, performance, and information latency. Using this feedback, transfer parameters may be automatically selected to maximize use of system resources to efficiently transfer subsequent objects.

For example, the method may determine that it is preferable to transfer an image to the end-user if the image is formatted in a lossless graphics image format (GIF), even though the image received by the ISP from the web site was formatted in a lossy joint photographic expert group (JPEG) format. The method would convert the image or part of the image from JPEG to GIF and download it to the end-user. This method may also be practiced with data audio, video, or any other type of media or multimedia object transfers.

In another embodiment, the end-user and/or the ISP may preselect and set desired transfer parameters which remain fixed during the selected transfer, during all transfers meeting specified criteria, or during all transfers in general. In yet another embodiment, the preselected parameters may be supplemented by parameters automatically selected by the invention using an earlier transfer feedback. For example, the ISP or the end-user might designate that all image transfers having pixel dimensions of 880×610 and 256 colors must occur using a 300×200 pixel dimension and 16 color restriction parameter. Also, transformations from one encoding format to another without substantially changing encoded information may occur to take advantage of varying efficiencies for different multimedia objects, or some information may be eliminated to compress a multimedia object (e.g., 64 k color images on a 256 k color machine). Alternatively, the present invention allows a parameter to be set only for a current transfer as described, and thereafter the parameter would be automatically set by the invention. In any case, other transfer parameters commonly known to those in the object transfer arts might be automatically selected by the method of the present invention.

In another embodiment, the invention may be implemented to provide a transformation apparatus for dynamically monitoring a media transfer from an ISP to an end-user and deciding which, if any, transformations of an object need to occur to speed-up the transfer. Thereafter, the transformation apparatus coordinates the implementation of the media transformation. The apparatus may include a buffer unit, a storage unit, and a processor, as well as other elements which are commonly known to those skilled in the art for making an object transfer.

In still another embodiment, the invention may be implemented to provide a signal-bearing medium tangibly embodying a program of machine-readable instructions executable by a digital data processing apparatus to perform method steps for dynamically monitoring and transforming, if prudent, media objects to efficiently transfer an object from an ISP to an end user's system.

The invention affords its users with a number of distinct advantages. For example, the invention improves upon traditional transfer techniques by adapting the object transfer to accommodate the limited bandwidth available at any given time for a transfer. Another advantage is that the invention dynamically adjusts the transfer parameters based upon a system's actual on-line performance and not solely upon theoretical criteria.

Yet another advantage is that the invention allows a variety of settings for the transfer parameters. For example, designated parameters may be fixed while other parameters are selected depending upon system performance, all parameters may be fixed, or a mixture of preset and performance selected criteria may be used. Furthermore, the invention also provides a number of other advantages and benefits, which should be apparent from the following description of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, and wherein.

DETAILED DESCRIPTION OF THE PREFERRED EMBODIMENTS

Hardware Components & Interconnections

Figure 1:
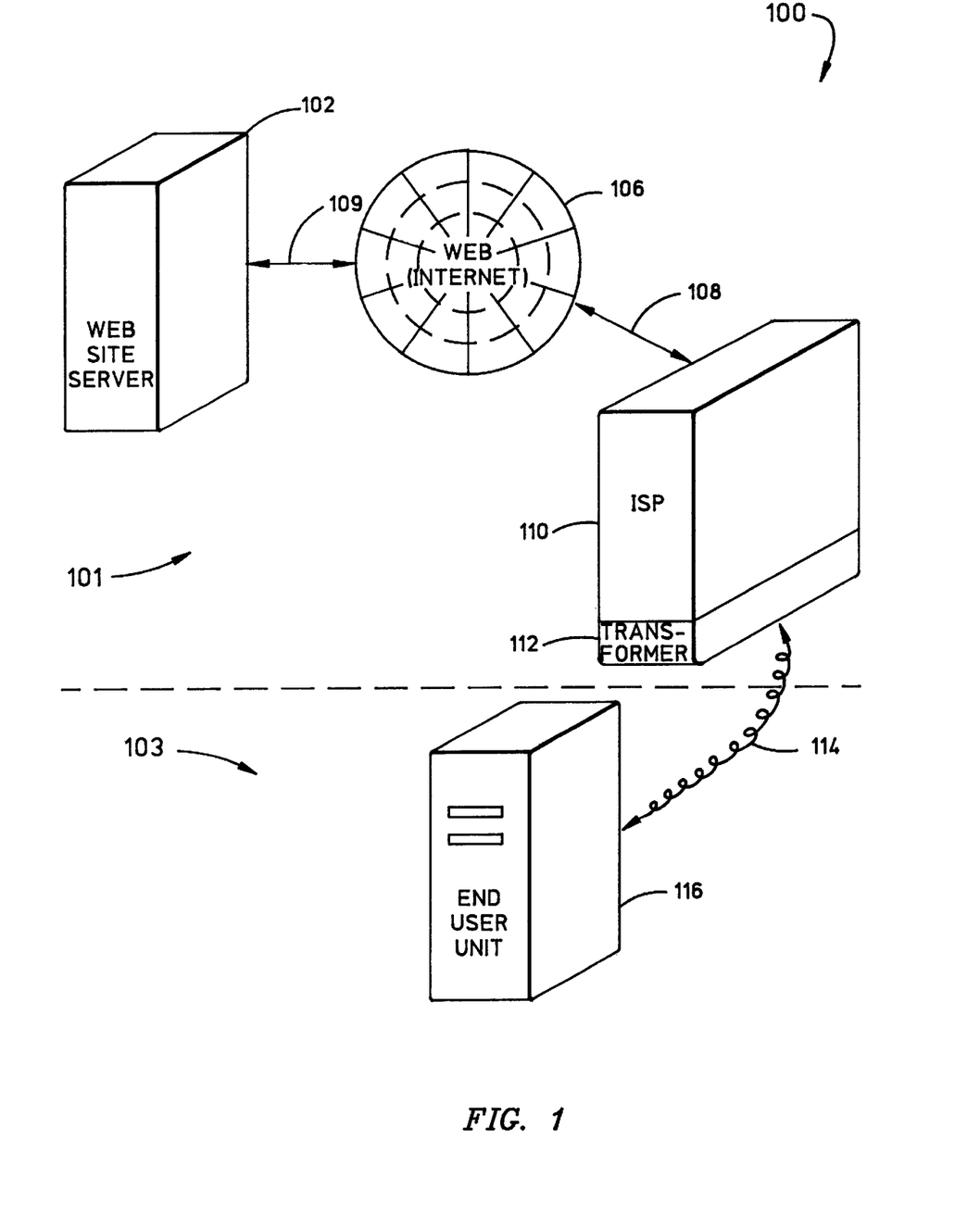
FIG. 1 is a general diagram showing a web-site-server-to-end-user-unit communication link as used in one embodiment of the present invention.

One aspect of the invention concerns the efficient transfer of one or more media objects from a first system to a second system, which may be embodied by various hardware components and interconnections as generally described in FIG. 1. Although the following detailed description of the invention is discussed in relationship to an internet system 100 as shown in FIG. 1, such description is not intended to limit the scope of the invention.

In FIG. 1, the internet system 100 as shown comprises two parts, a first system 101 and a second system 103. The first system 101 may include a web site server 102 communicatively connected via a web 106 to an internet service provider (ISP) 110 using fast-link communication channels 108 and 109. The server 102 may act as a host location for media or multimedia objects. In one embodiment, the server 102 may be a mainframe computer manufactured by the International Business Machines Corporation of Armonk, N.Y., and may use an operating system sold under trademarks such as MVS. Or, the server 102 may be a Unix computer, or OS/2 server, or Windows NT server or IBM RS/6000 530 workstation with 128 MB of main memory running AIX 3.2.5. The server 102 may incorporate a database system, such as DB2 or ORACLE, or it may access data on files stored on a data storage medium such as disk, e.g., a 2 GB SCSI 3.5" drive, or tape.

In another embodiment, the web site server 102 may comprise one or more magnetic data storage disks commonly referred to as direct access storage devices (DASD). As is well known in the art, the multimedia objects may be stored by the server 102 in various formats depending upon the type of media. For example, a cartoon figure might be stored in a graphic image format (GIF) and a photograph might be stored in a tagged image format file (TIFF), or a joint photographic expert group (JPEG) format.

The ISP 110 may be connected to the second system 103 comprising an end-user unit 116 via a slow-link channel 114, where the ISP 110 controls the passage of information between the web site server 102 and the end-user unit 116. "Fast-link" and "slow-link", as mentioned above, refer to the relative speed with which the communication channels 108 and 114 can transfer a media object. In any case, the object transfer capabilities of the fast-link channel must exceed those of the slow-link channel, and one or both links may comprise a line, bus, cable, electromagnetic link, microwave, radio signal, or other wireless means tor exchanging commands media objects, and other information and data between the web site server 102, the ISP 110, and the end-user unit 116. If the fast-link channel transfer rate is less than the slow-link transfer rate, no transformation is necessary.

Among other features, the ISP 110 may include a fire wall used as a means of reducing the risk of unwanted access to the end-user unit 116. Although the ISP 110 is pictured as a separate device, the ISP may be integral to the end-user unit 116. The ISP 110 may also include a transformer 112 that, as discussed below may be used to transform a media object and set and/or implement transfer parameters to facilitate efficient transfer of the media object between the transformer 112 and the end-user unit 116. In another embodiment, the ISP 110 may be eliminated from the system 100 and the transformer 112 may be integral to the web site server 102, or may be included within the second system 103 rather than the first system 101 as shown.

Figure 2:
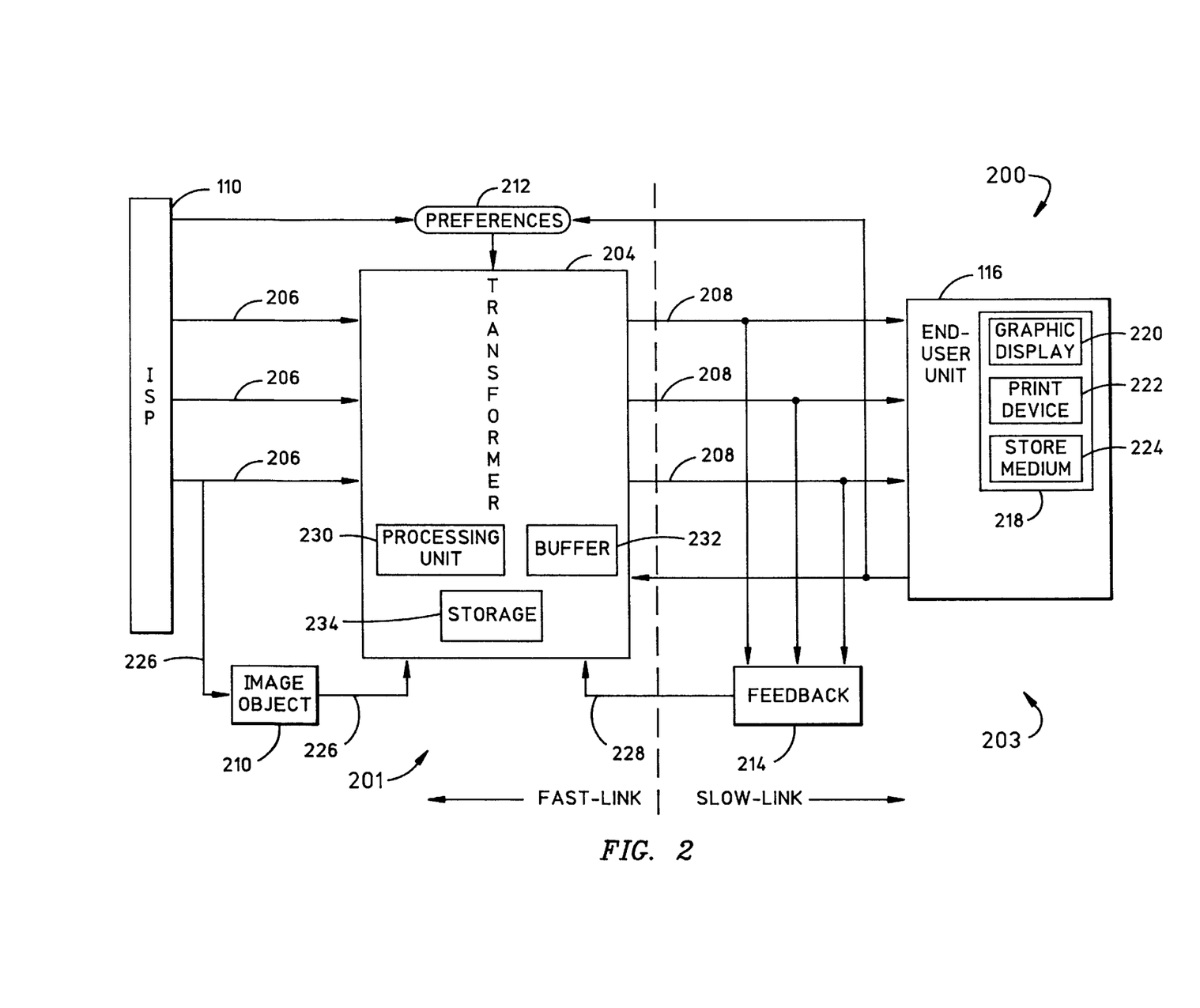
FIG. 2 is a block diagram of first system and second system digital data processing machines used in accordance with one embodiment of the present invention, including the hardware components and interconnections of the transformation apparatus shown in FIG. 1.

The end-user unit 116 may include a processing unit (not shown), such as a microprocessor or other processing machine, communicatively coupled to a storage unit. The storage unit may include a fast-access memory and may include nonvolatile storage. The fast-access memory preferably comprises random access memory, and may be used to store the programming instructions executed by the processing unit during execution of a computer program. The nonvolatile storage may comprise, for example, one or more magnetic data storage disks such as a "hard drive" or any other suitable storage device. Further, as shown in FIG. 2, the end-user unit 116 may include in one embodiment an output module 218 for outputting or displaying program status results on a graphic display 220, print device 222 or storage medium 224.

Exemplary Digital Data Processing Apparatus

Another aspect of the invention concerns a digital data processing apparatus. which may be embodied by various hardware components and interconnections. FIG. 2 includes an example of one such digital data processing apparatus, that is, a transformer 204.

The transformer 204 may include a processing unit 230, such as a microprocessor or other processing machine, coupled to a storage unit 234. In the present example, the storage unit 234 includes a fast-access memory and nonvolatile storage. However, other types of memory units well known to those skilled in the art may be used. The fast-access memory preferably comprises random access memory, and may be used to store the programming instructions executed by the processing unit 230 during such execution. The nonvolatile storage included in storage unit 234 may comprise an EEPROM, for example, or one or more magnetic data storage disks such as a "hard drive", a tape drive, or any other suitable storage device. The transformer 204 utilizes input/output channels 206 and 208 which may be of similar construct as that mentioned above for fast-and slow-link communication channels 108, 109, and 116.

Generally, the transformer 204 receives a media object from the ISP 110 along channels 206. The media object may be an image, text, video, audio, or any type or combination of media. The media may be transferred in any standard format. For example, a photograph might be formatted in JPEG whereas a cartoon might be formatted in GIF. For clarity, the following discussion uses a multimedia transfer comprising text and an image. However, a similar process as that discussed below would apply regardless of the media or multimedia objects transferred. For example the following discussion could be applied to a multimedia transfer including video and audio.

When text is transferred from the ISP 110 to the transformer 204, an asynchronous transmission of an image object 210 also occurs. The transfer of the image object 210 is represented in FIG. 2 as occurring along the image transfer channel 226. However, it should be understood that the image transfer channel 226 may be integral to or the same as the communication channel 206. Once the image object 210 is received by the transformer 204, the image is transformed based upon known limitations of a slow-link side 203 of the internet system 100. The transformation allows efficient transfer of the image object 210 and the text to the end-user unit 116. Transformation is necessary because the fast-link side 201 of the internet system 100 can transfer a media object at a much higher rate than the slow-link side 203 of the internet system 100. This fast-link/slow-link division of hardware and communication channels of the system 100 is approximated in FIG. 2 by a dashed line.

As mentioned above, the transformer 204 may include, in the preferred embodiment, the processing unit 230, the storage unit 234 and the buffer unit 232. When the text and the image object 210 are received by the processing unit 230 of the transformer 204, the processing unit determines whether any preferences 212 have been preset. Preferences may be preset using the end-user unit 116 or the ISP 110. Preferably, preferences 212 are kept within the storage 234 of the transformer 204 and may be accessed by the processing unit 230. In an alternate embodiment, the preferences 212 may be stored at the ISP 110. Regardless of where the preferences 212 are housed, the preferences may comprise defining parameters of the end-user unit 116 performance characteristics and limitations, the degree of lossy as specified by the end-user unit, the number of colors to be used in processing the media, whether the media should be processed in color or without color, the clarity of the media, and whether or not the media should be transferred to the end-user unit 116 either interlaced or non-interlaced. Furthermore, the preferences 212 can define the above parameters either as a default preference, a preference for a designated web site server, a preference for one particular download instance or for any combination of downloads desired by the end-user unit 116 The purpose of the preferences 212 is to allow the parameters of a transfer of a media object or a multimedia object to be preset in whole or in part as desired.

After the processing unit 230 determines whether any preferences 212 have been preselected, the transformer 204 executes the preferences 212 and automatically sets other known parameters to assure efficient transfer of media objects to the end-user unit 116. For example the transformer 204 may automatically change the format of a media object, assuming a preferred format has not been designated, in order to reduce the bandwidth required for the transfer. Or, the transformer 204, knowing that the end-user unit 116 only has 16 color capabilities, may convert an image object transferred from the web site server 102 to the ISP 110 in 256 colors to the 16 color format of the end-user unit. This transformation alone significantly reduces the number of bytes which must be transferred to recreate the image object on the end-user unit. In another case, after the transformer 204 has transformed an image object 210 as described above, the image may be stored in a cache location so that future transfers of the image may be more quickly executed than if the transformation process had to be recreated.

After a transformation of an image object 210 has occurred, the image object is transferred via the slow-link communication channels 208 to the end unit 116. During this transfer, feedback 214—a survey to determine the efficiency with which the media object is being transferred—is relayed to the transformer 204 via feedback communication channel 228. Feedback as to the available bandwidth during the transfer, for example, is stored in the storage unit 234 and used by the processing unit 230 to set future transfer parameters effectively "fine-tuning" the media transfer process and making it more efficient. Other feedback information may also be returned to the transformer 204, such as feedback pertaining to the latency of the transfer.

The media object is received by the end-user unit 116 which, in one embodiment, may comprise the output module 218. The output module may allow the end-user to view any media object transferred from the transformer 204 on the graphic display 220, to print a reproduction of any media object transferred on the print device 222, or to store the media object transferred in the storage medium 224 so that it could be used at a later date by the end-user.

Despite the specific foregoing description, ordinarily skilled artisans having the benefit of this disclosure will recognize that the apparatus discussed above may be implemented in a machine of different construction or configuration, without departing from the scope of the invention. As a specific example, one of the components of output module 218, such as graphic display 220, may be eliminated; furthermore, the storage unit 234 may be provided on-board the processing unit 230, even though depicted separately in FIG. 2.

Operation

In addition to the various hardware embodiments described above, a different aspect of the invention concerns a method for efficiently transferring media objects from the first system 101 to the second system 103.

Signal-Bearing Media

Such a method may be implemented, for example, by operating the transformer 204 to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to efficiently transfer media objects from one system to another system.

Figure 3:
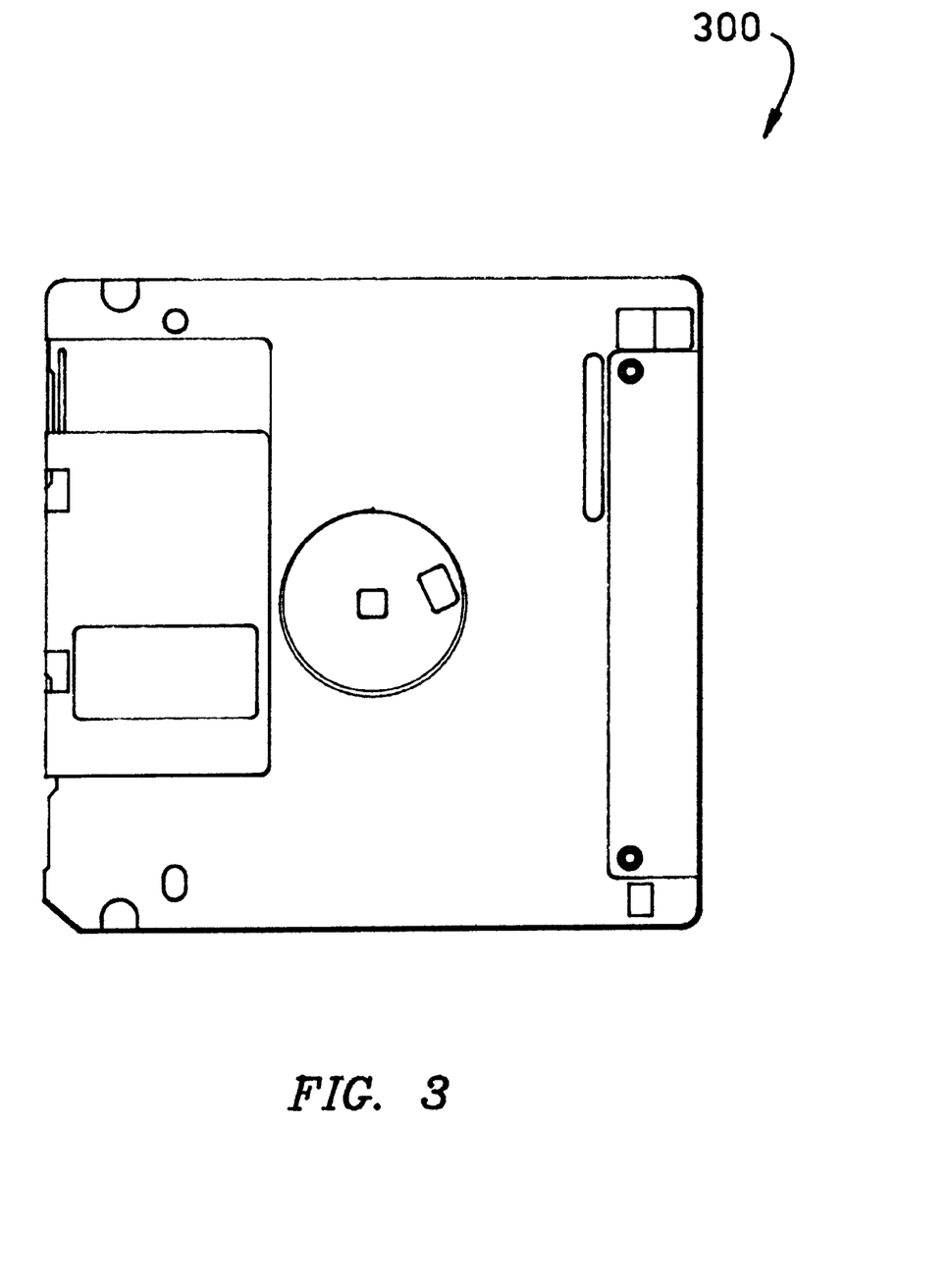
FIG. 3 is a perspective view of an exemplary signal-bearing medium in accordance with one embodiment of the present invention.

This signal-bearing media may comprise, for example, RAM (not shown) contained within the transformer 204 Alternatively, the instructions may be contained in another signal-bearing media, such as a magnetic data storage diskette 300 (FIG. 3), directly or indirectly accessible by the transformer 204. For example, the storage diskette may be accessed through the end-user unit 116. Whether contained in the transformer 204 or elsewhere, the instructions may be stored on a variety of machine-readable data storage media, such as DASD storage (e.g., a conventional "hard drive" or a RAID array), magnetic tape, electronic read-only memory (e.g. ROM, CD-ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise lines of compiled C++ language code, or any other suitable computer language.

Overall Sequence of Operation

Figure 4:
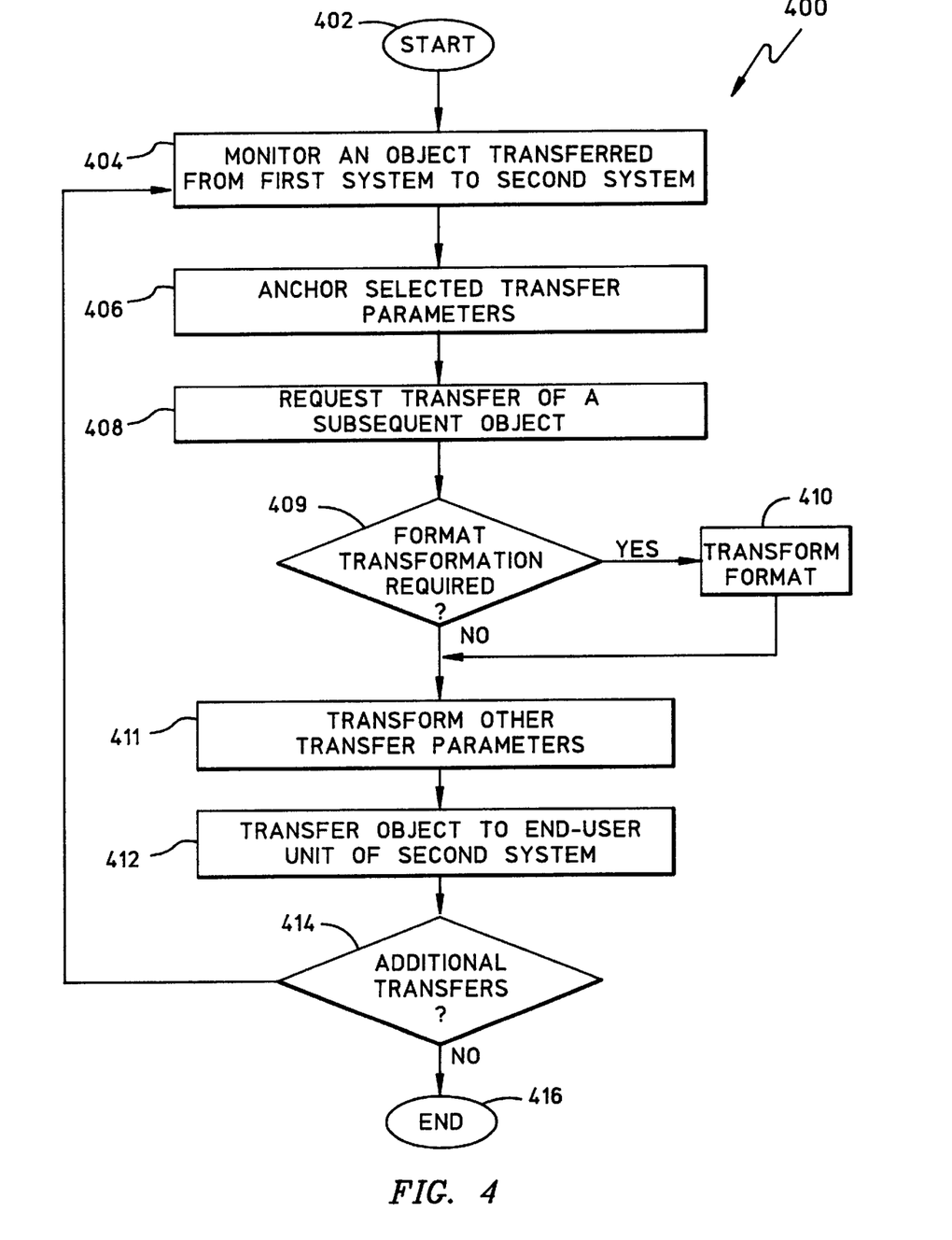
FIG. 4 is a flowchart of a dynamic operational sequence for efficiently transferring a media object in accordance with one embodiment of the present invention.

FIG. 4 shows a sequence of method steps 400 to illustrate one example of the method aspect of the present invention. For ease of explanation, but without any limitation intended thereby, the example of FIG. 4 is described in the context of the internet system 100 described above. The steps are initiated in task 402, when an end-user requests that a media object be transferred to or from the end-user unit 116.

After the transfer of a media object has begun from the web site server 102, the transformer 204 monitors in task 404 the object transfer from the first system 101 to the second system 103 shown in FIG. 2. While monitoring the object transfer, such as transfer of the image object 210, feedback as to the latency and the bandwidth usage and restrictions are sent to the transformer 204 via feedback communication channel 228. This "feedback" information may be used by the transformer 204 to dynamically modify future transfers of media objects.

As discussed above, the transformer 204 also incorporates any preferences 212 which were preset by the end-user unit 116 or the ISP 110 in determining the most efficient way to transfer a media object. Selection of the most efficient way is based upon the preset preferences 212 and the first system 101 and the second system 103 performance limitations. For example, a storage unit used by the end-user unit 116 might have insufficient capacity to receive an image transferred in the JPEG format. Accordingly, the transformer, knowing the end-user unit's 116 storage limitations, would transform the image object into a format which could be fully received by the storage unit within the end-user unit 116.

Monitoring the object transferred from the first system to the second system in task 404 allows the transformer 204 to anchor selected transfer parameters in task 406. "Anchoring" refers to presetting selected transfer parameters based upon the monitoring of task 404 and may include user specified preferences. If the transformer 204 includes a storage unit 234, the storage unit may be used by the anchoring step of task 406 to store the media object transfer parameters for future use in transferring the object to the end-user unit 116 if later requested. This feature is advantageous if a media object is often requested by the end-user unit 116.

Thereafter, when the end-user unit 116 requests the transfer of a subsequent media object in task 408, the transformer 204 uses any preferences 212 and the anchored parameters discovered in task 406 in initiating an efficient transfer of the subsequent media object to the end-user unit 116. The format transformation discussed above occurs in task 410 after the request for the transfer of a media object has been made by the end-user unit 116.

In another embodiment, the processor unit 230 of the transformer 204 may fully or partially process the media object into one or more formats which may be compressed, not compressed, or partially compressed. The object may also be transferred into one format or a combination of formats in tasks 409 to more efficiently transfer the media object. The media object would then be reprocessed and/or decompressed by the end-user unit 116. If a format change is prudent, then the transformer 204 transforms the objects format in task 410. If other transfer parameters require changing due to the new format implementation to streamline the object transfer, these parameters are transformed in task 411.

In another embodiment, a request for the transfer of a media object may be an automatic transfer preselected to occur at a predesignated time either by the ISP 110, the end-user unit 116 or the web site server 102. An example of such a transfer would be a "cookie" which is transferred to the end-user unit 116 commonly without knowledge or specific request by the end-user unit. After format and parameter transformations, if any, have been initiated by the transformer 204, the object is transferred from the first system 101 to the end-user unit 116 of the second system 103 in task 412.

Transformation of the parameters and formats used continue as the transfer of other media objects to the second system 103 occurs, as shown in task 414. Each time the transformer 204 receives feedback during the transfer and uses the feedback information to anchor future format and transfer parameters. This feedback arrangement assures that a transfer of a media object from an ISP 110 to an end-user unit 116 occurs in the most efficient manner based upon current system limitations. The method 400 ends in task 416 when the transfer of an object to the second system 103 has been completed and modification of future parameters is no longer possible or desired.

Although the method 400 above has been described in relation to the transfer of a media object, the method may be applied to the concurrent transfer of multimedia objects. For example, the transfer of a video media object and text media object may occur at the same time with the transformer 204 performing similar functions for both transfers. In other words, regardless of the media object being transferred and the timing of the transfer, the transformer 204 may dynamically transform the media object and system parameters to assure an efficient transfer of the object to the end-user unit 116.

Other Embodiments

While there have been shown what are presently considered to be preferred embodiments of the invention, it will be apparent to those skilled in the art that various changes and modifications can be made herein without departing from the scope of the invention as defined by the appended claims.

We claim:

1. A dynamic method for efficiently transferring a media object from a first system to a second system, comprising:

monitoring a transfer of an object from the first system to the second system to determine transfer capabilities and performance characteristics;

anchoring selected transfer parameters if desired to prevent said selected parameters from dynamically changing;

requesting an object to be transferred from the first system to the second system;

transforming transfer parameters based on said monitoring to increase efficiency of said object transfer; and transferring said object from the first system to the second system.

2. The dynamic method recited in claim 1, transforming transfer parameters including:

processing said object using multiple formats;

determining favored format for transferring said object to increase efficiency of said object transfer; and selecting said favored format for the transfer of said object.

3. The dynamic method recited in claim 2, including converting said object to its original format after said object has been transferred to the second system.

4. The dynamic method recited in claim 2, transforming transfer parameters further including:

processing said object using multiple compression techniques;

determining a favored compression technique for transferring said object to increase efficiency of the transfer while maintaining acceptable object clarity; and using said favored technique to transfer said object.

5. The dynamic method recited in claim 2 wherein monitoring said transfer of said object to determine system transfer capabilities and performance characteristics includes:

caching said determinations; and using said determinations to anchor parameters for future transfers of an object.

6. The dynamic method recited in claim 4, including allowing a second system user to request an original version of the media object transferred from the first system.

7. The dynamic method recited in claim 5, wherein a first system user and/or a second system user may selectively anchor said transfer parameters.

8. The dynamic method recited in claim 7, transforming transfer parameters further including:

processing said object using multiple compression techniques;

determining a favored compression technique for transferring said object to increase efficiency of the object transfer; and using said favored compression technique for the transfer of said object.

9. A signal-bearing medium tangibly embodying a program of machine-readable instructions executable by a digital processing apparatus to perform a method for efficiently transferring a media object from a first system to a second system, said method comprising:

monitoring a transfer of an object from the first system to the second system to determine transfer capabilities and performance characteristics;

anchoring selected transfer parameters if desired to prevent said selected parameters from dynamically changing;

requesting an object to be transferred from the first system to the second system;

transforming transfer parameters based on said monitoring to increase efficiency of said object transfer; and transferring said object from the first system to the second system.

10. The signal-bearing medium used to efficiently transfer a media object from a first system to a second system recited in claim 9, transforming transfer parameters including:

processing said object using multiple formats;

determining favored format for transferring said object to increase efficiency of said object transfer; and selecting said favored format for the transfer of said object.

11. The signal-bearing medium used to efficiently transfer a media object from a first system to a second system recited in claim 10, transforming transfer parameters including converting said object to its original format after said object has been transferred to the second system.

12. The signal-bearing medium used to efficiently transfer a media object from a first system to a second system recited in claim 10, transforming transfer parameters further including:

processing said object using multiple compression techniques;

determining a favored compression technique for transferring said object to increase efficiency of the transfer while maintaining acceptable object clarity; and using said favored technique to transfer said object.

13. The signal-bearing medium used to efficiently transfer a media object from a first system to a second system recited in claim 10, monitoring said transfer of said object to determine system transfer capabilities and performance characteristics includes:

caching said determinations; and using said determinations to anchor parameters for future transfers of an object.

14. The signal-bearing medium used to efficiently transfer a media object from a first system to a second system recited in claim 12, including allowing a second system user to request an original version of the media object transferred from the first system.

15. The signal-bearing medium used to efficiently transfer a media object from a first system to a second system recited in claim 13, wherein a first system user and/or a second system user may selectively anchor said transfer parameters.

16. The signal-bearing medium used to efficiently transfer a media object from a first system to a second system recited in claim 15, transforming transfer parameters further including:

processing said object using multiple compression techniques;

determining favored compression technique for transferring said object to increase efficiency of said object transfer; and selecting said favored compression technique for the transfer of said object.

17. An apparatus to efficiently transfer a media object from a first system to a second system, comprising:

a storage unit;

a processing unit;

wherein the apparatus is capable of:

monitoring a transfer of an object from the first system to the second system to determine transfer capabilities and performance characteristics;

anchoring selected transfer parameters if desired to prevent said selected parameters from dynamically changing;

requesting an object to be transferred from the first system to the second system;

transforming transfer parameters based on said monitoring to increase efficiency of said object transfer; and transferring said object from the first system to the second system.

18. The apparatus recited in claim 17, transforming transfer parameters including:

processing said object using multiple formats;

determining favored format for transferring said object to increase efficiency of said object transfer; and selecting said favored format for the transfer of said object.

19. The apparatus recited in claim 17, transforming transfer parameters including converting said object to its original format after said object has been transferred to the second system.

20. The apparatus recited in claim 18, transforming transfer parameters further including:

processing said object using multiple compression techniques;

determining a favored compression technique for transferring said object to increase efficiency of the transfer while maintaining acceptable object clarity; and using said favored technique to transfer said object.

21. The apparatus recited in claim 18, monitoring said transfer of said object to determine system transfer capabilities and performance characteristics including:

caching said determinations; and using said determinations to anchor parameters for future transfers of an object.

22. The apparatus recited in claim 20, including allowing a second system user to request an original version of the media object transferred from the first system.

23. The apparatus recited in claim 21, wherein a first system user and/or a second system user may selectively anchor said transfer parameters.

24. The apparatus recited in claim 17, transforming transfer parameters further including:

processing said object using multiple compression techniques;

determining favored compression technique for transferring said object to increase efficiency of said object transfer; and selecting said favored compression technique for the transfer of said object.

25. An apparatus to efficiently transfer a media object from a first system to a second system, comprising:

storage means;

processing means;

wherein the apparatus is capable of:

monitoring a transfer of an object from the first system to the second system to determine transfer capabilities and performance characteristics;

anchoring selected transfer parameters if desired to prevent said selected parameters from dynamically changing;

requesting an object to be transferred from the first system to the second system;

transforming transfer parameters based on said monitoring to increase efficiency of said object transfer; and transferring said object from the first system to the second system.

26. The apparatus recited in claim 25, transforming transfer parameters including:

processing said object using multiple formats;

determining favored format for transferring said object to increase efficiency of said object transfer; and selecting said favored format for the transfer of said object.

27. The apparatus recited in claim 25, transforming transfer parameters including converting said object to its original format after said object has been transferred to the second system.

28. The apparatus recited in claim 26, transforming transfer parameters further including:

processing said object using multiple compression techniques;

determining a favored compression technique for transferring said object to increase efficiency of the transfer while maintaining acceptable object clarity; and using said favored technique to transfer said object.

29. The apparatus recited in claim 26, monitoring said transfer of said object to determine system transfer capabilities and performance characteristics including:

caching said determinations; and using said determinations to anchor parameters for future transfers of an object.

30. The apparatus recited in claim 28, including allowing a second system user to request an original version of the media object transferred from the first system.

31. The apparatus recited in claim 29, wherein a first system user and/or a second system user may selectively anchor said transfer parameters.

32. The apparatus recited in claim 25, transforming transfer parameters further including:

processing said object using multiple compression techniques;

determining favored compression technique for transferring said object to increase efficiency of said object transfer; and selecting said favored compression technique for the transfer of said object.

* * * * *